May 12, 1931.  P. PEDERSEN  1,805,184
VEHICLE TOP OPERATING MECHANISM
Filed March 15, 1929

INVENTOR
Paul Pedersen,
By Attorneys,
Abraham Engel.

Patented May 12, 1931

1,805,184

UNITED STATES PATENT OFFICE

PAUL PEDERSEN, OF NEW YORK, N. Y.

VEHICLE TOP OPERATING MECHANISM

Application filed March 15, 1929. Serial No. 347,207.

The present invention relates to a vehicle top operating mechanism for lowering and raising a vehicle top and aims to provide certain improvements therein.

Heretofore various mechanical means have been devised for lowering and raising the top of a vehicle and more particularly the top of an automobile touring car, the rear top of a landaulet and the rear top of a taxicab, but for various reasons these devices have proven deficient or impracticable and therefore have not found their way into commercial use.

According to my present invention I provide a mechanism for the purpose set forth, which is simple and sturdy in construction, economical to manufacture and practically fool proof in operation, one which may be readily incorporated into the present construction of automobiles without requiring any change in the formation of either the automobile body or its top and one wherein the automobile top may be securely held in any desired position intermediate its raised and lowered extremes.

In its preferred construction the present invention consists of operating means for lowering and raising the flexible canopy at the rear top of an automobile which canopy is mounted on pivotal supporting means, said operating means comprising a rotatable shaft extending across the rear of the vehicle body and passing through the sides thereof and supported thereby, means controllable by the operator for rotating said shaft, and means carried by said shaft for moving the canopy supporting means about their pivotal points as the shaft is rotated. The invention also embodies other features and details of construction which will be hereinafter more fully described.

A preferred embodiment of my invention is illustrated in the accompanying drawings, wherein.

Figure 1:
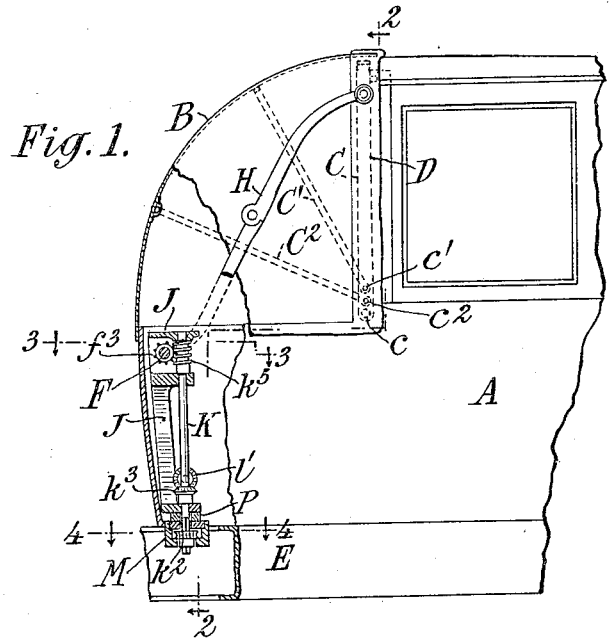
Figure 1 is a side elevation of the rear portion of a landaulet with parts broken away to show the operating mechanism of the present invention.
Figure 2:
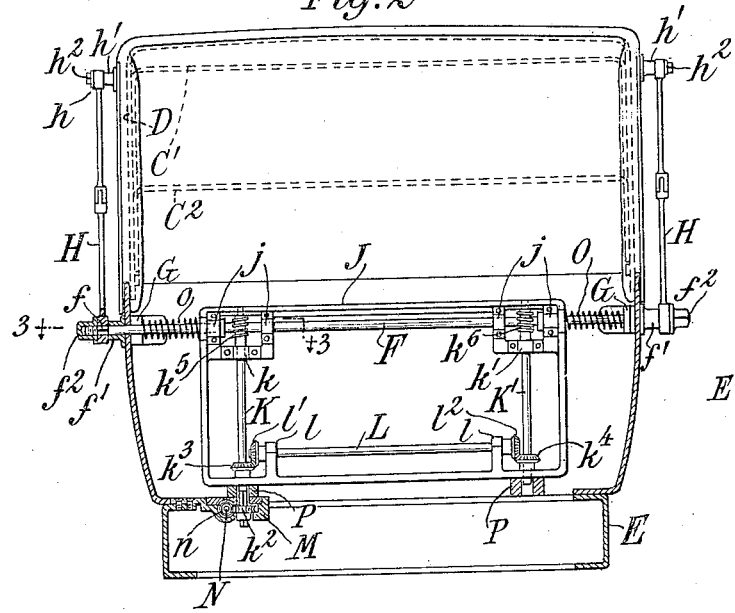
Fig. 2 is a section taken substantially along the broken line 2—2 of Fig. 1.
Figure 4:
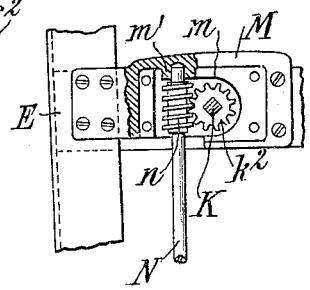
Fig. 4 is a section taken substantially along the plane of the line 4—4 of Fig. 1.
Figure 3:
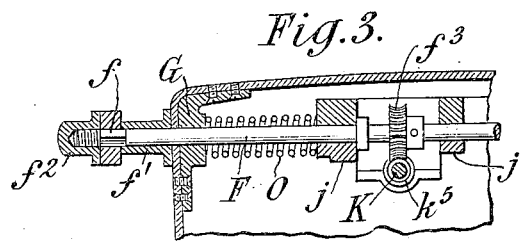
Fig. 3 is an enlarged section taken substantially along the plane of the line 3—3 of Fig. 2.

Referring to the drawings in the various figures of which the same reference characters are employed to designate like parts, let A indicate the body of a landaulet, which is mounted upon a chassis E, said body being provided at its rear top with a flexible canopy B supported upon a plurality of bows C, C' and $C^2$ which are pivotally mounted at their ends as indicated at $c$, $c'$ and $c^2$ respectively to uprights or stiles D in a conventional manner. The canopy B is likewise secured to the sides and rear of the body A in a conventional manner.

The flexible canopy B may be lowered and raised by moving the bow C about its pivots $c$, which action is readily accomplished by an operating mechanism which comprises a horizontally disposed shaft F extending across the rear of the body and through the opposite sides thereof. The shaft F is supported in suitable bearings G formed in castings which preferably conform to the interior of the sides of the body to which they are secured in any suitable manner. The ends of the shaft F extend outwardly from the sides of the body a substantial distance and are formed near its ends with squared portions $f$ upon which are fitted the ends of hinged or toggle brackets H, the opposite ends of which are secured to the bow C near its top, as indicated at $h$. To properly maintain the brackets H in spaced relation to the body A and the bows C, C' and $C^2$, and to allow for the folding of the flexible canopy, spacing sleeves $f'$ and $h'$ respectively are employed. The brackets H are secured to their respective anchorages by cap nuts $f^2$ and $h^2$ respectively.

The shaft F is preferably carried in suitable bearings $j$ provided on a substantially rectangular frame J, which also serve to support secondary shafts K, K' and a supplemental shaft L in suitable bearings $k$, $k'$ and $l$, $l$ respectively. The secondary shaft K is also supported in upright position in a bearing $m$ provided in a casting M mounted upon the chassis E, which casting M also has a second bearing $m'$ which serves to support one end of a driving shaft N. This driving shaft N may be driven in any suitable manner from the main driving shaft of the automobile or from an independent source of power, such as an electric motor and controlled by a suitable clutch, the driving connection and clutch being not herein shown since they may be of any approved construction.

The secondary shaft K is adapted to be driven by the driving shaft N through the medium of a worm $n$ carried by said shaft N in mesh with a gear $k^2$ mounted on the shaft K. The secondary shaft K in turn is adapted to drive the secondary shaft K' through the medium of the supplemental shaft L through miter gears $k^3$, $l'$ and $l^2$ $k^4$ respectively. The secondary shafts K and K' in turn drive the shaft F at spaced apart points through the medium of the right and left threaded worms $k^5$ and $k^6$, in mesh respectively with gears $f^3$. The advantage of this type of drive resides in the fact that the driving force may be applied at equal distances from the ends of the shaft and thereby better sustain the strains incident thereon while raising and lowering the canopy supporting bows.

For the purpose of cushioning the thrusts which might be imparted to the various shafts and their bearings, I propose to insert cushioning means, such as heavy coil springs O around the shaft F between the bearings G and $j$ and cushioning blocks P around the secondary shafts K and K' between the frame J and the chassis E.

From the foregoing description it will be apparent that upon rotation in either direction of the driving shaft N, which is controllable by the operator, rotation will be communicated through the various driving connections to the shaft F to open or close the toggle brackets H, and thereby move the bows about their pivot points to raise or lower the flexible canopy of the landaulet. It will also be apparent that rotation of the shaft F may be arrested so as to hold the brackets H in an intermediate position between its closed and open extremes to hold the canopy in a partially open position if such adjustment is desired. It will also be apparent that the canopy will be maintained in any adjusted position until moved at the will of the operator since the shaft F will be held against rotation by the worms $k^5$ and $k^6$ except when driven thereby.

While I have shown and described a preferred embodiment of my invention, it is to be understood that I do not wish to be limited to the specific details of construction as herein disclosed, since modifications thereof may be resorted to without departing from the spirit of the invention.

What I claim is:

1. A vehicle top lowering and raising mechanism, comprising a rigid frame disposed within the vehicle body substantially parallel to the rear wall thereof, said frame having bearings therein, a horizontally disposed shaft carried by said frame, the ends of said shaft extending through the opposite sides of the vehicle body at the rear thereof, toggle brackets connected to the ends of said shaft and to the vehicle top, means carried by said frame for rotating said shaft, and driving means controllable by the operator of the vehicle for driving said first named means.

2. A vehicle top lowering and raising mechanism, comprising a substantially rectangular rigid frame disposed within the vehicle body substantially parallel to the rear wall thereof, said frame having bearings thereon, a horizontally disposed shaft supported in bearings on said frame, the ends of said shaft extending through the opposite sides of the vehicle body at the rear thereof, secondary shafts supported in bearings on said frame and angularly disposed with relation to the first shaft, driving means on said secondary shafts for simultaneously imparting equal rotative force to said first shaft at spaced apart points which are equi-distant from the respective ends of the shaft, and rotatable means controllable by the operator of the vehicle for driving one of the secondary shafts.

3. A vehicle top lowering and raising mechanism, comprising a substantially rectangular frame having bearings thereon disposed uprightly within the vehicle body near the rear wall thereof, a horizontally disposed shaft supported in bearings on said frame, the ends of said shaft extending through the opposite sides of the vehicle body at the rear thereof, secondary shafts supported in bearings on said frame and angularly disposed with relation to the first shaft, right and left hand threaded worms on said respective secondary shafts in mesh with gears on said first shaft for simultaneously imparting rotation to said first shaft at spaced apart points, one of said secondary shafts being driven by the other secondary shaft through a supplemental shaft supported in bearings on the frame, and rotatable means controllable from the interior of the vehicle for driving one of the secondary shafts.

In witness whereof, I have hereunto signed my name.

PAUL PEDERSEN.